United States Patent
Jaynes

(10) Patent No.: US 11,115,366 B2
(45) Date of Patent: Sep. 7, 2021

(54) COMMUNICATION AND CONVERSATION BETWEEN INDIVIDUALS AND SERVICE PROVIDERS

(71) Applicant: Collaborism, Incorporated, Mt. Vernon, OH (US)

(72) Inventor: Bruce Jaynes, Mt. Vernon, OH (US)

(*) Notice: Subject to any disclaimer, the term of this patent is extended or adjusted under 35 U.S.C. 154(b) by 0 days.

(21) Appl. No.: 16/879,712

(22) Filed: May 20, 2020

(65) Prior Publication Data
US 2020/0374255 A1 Nov. 26, 2020

Related U.S. Application Data

(60) Provisional application No. 62/850,004, filed on May 20, 2019.

(51) Int. Cl.
| | | |
|---|---|---|
| *H04L 12/58* | (2006.01) | |
| *H04L 9/32* | (2006.01) | |
| *H04L 9/06* | (2006.01) | |

(52) U.S. Cl.
CPC ............ *H04L 51/22* (2013.01); *H04L 9/0637* (2013.01); *H04L 9/3297* (2013.01); *H04L 51/16* (2013.01)

(58) Field of Classification Search
CPC ........ H04L 51/16; H04L 51/22; H04L 9/0637; H04L 9/3297
See application file for complete search history.

(56) References Cited

U.S. PATENT DOCUMENTS

| | | | |
|---|---|---|---|
| 2015/0348169 A1* | 12/2015 | Harris | G06Q 30/0633 705/26.8 |
| 2019/0236598 A1* | 8/2019 | Padmanabhan | G06Q 20/4016 |
| 2020/0272981 A1* | 8/2020 | Kirkegaard | G06Q 30/0283 |
| 2020/0349561 A1* | 11/2020 | Kuchkovsky Jimenez | G06F 16/2365 |

* cited by examiner

*Primary Examiner* — Azizul Choudhury
(74) *Attorney, Agent, or Firm* — Furr Law Firm; Jeffrey Furr, Esq.

(57) ABSTRACT

The current invention is a system for ongoing communication and conversation between an individual user and a service provider. The system will use blockchain to secure the communication. The system is set up so that the individual will own its on data through the communication process. The system will use artificial intelligent ("AI") that translates the commination in a way the each individual needs to see it by providing a translation function.

4 Claims, 3 Drawing Sheets

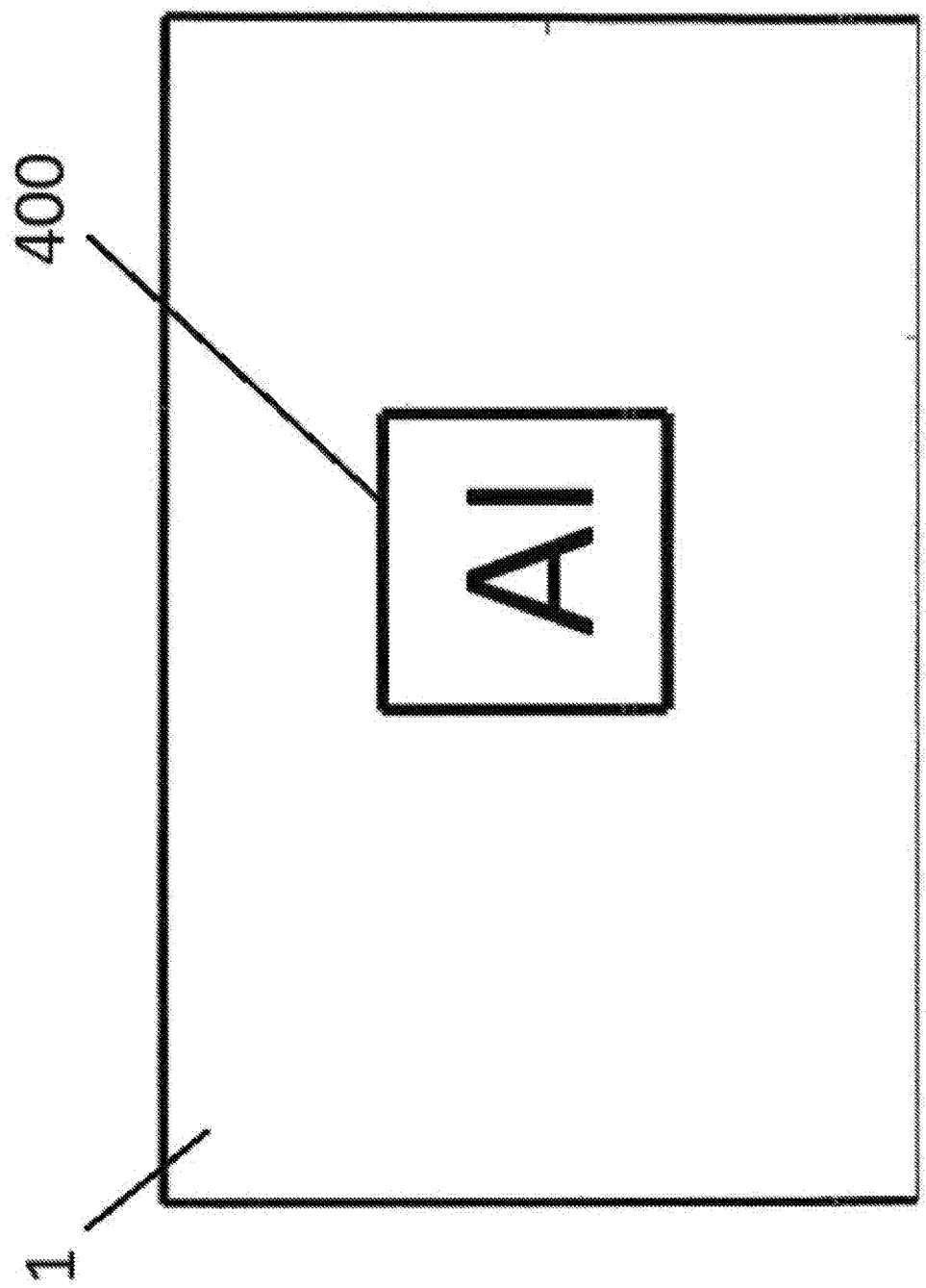

COMMUNICATION AND CONVERSATION BETWEEN INDIVIDUALS AND SERVICE PROVIDERS

CROSS-REFERENCES TO RELATED APPLICATIONS (IF ANY)

The current application is a non-provisional application claiming the priority date of provisional application 62/850,004 filed May 20, 2019.

BACKGROUND

1. Field of the Invention

This invention relates to a system for sending and receiving communication and conversation.

2. Description of Prior Art

People have been sending and receiving communications and conversations with other people and companies using platforms social medium such as Facebook. But the issues with these types of communication is that these company' own the right to the data and they do not automatically prepare the data to be properly sent from one party to the other.

There is still room for improvement in the art.

SUMMARY OF THE INVENTION

The current invention is a system for ongoing communication and conversation between an individual user and a service provider. The system will use blockchain to secure the communication.

The system is set up so that the individual will own its on data through the communication process.

The individuals can deliver their data to the service providers for better individualized service.

The system will use artificial intelligent ("AI") that translates the commination in a way the each individual needs to see it. The system will have a translation function.

BRIEF DESCRIPTION OF THE DRAWINGS

Without restricting the full scope of this invention, the preferred form of this invention is illustrated in the following drawings:

FIG. 4 shows the artificial intelligence.

DESCRIPTION OF THE PREFERRED EMBODIMENT

The current invention is a system 1 and application that allows an individual 3 to have ongoing electronic communications and conversations with a service provider 5. These communications can be done electronically via the Internet and/or between websites.

Figure 1:
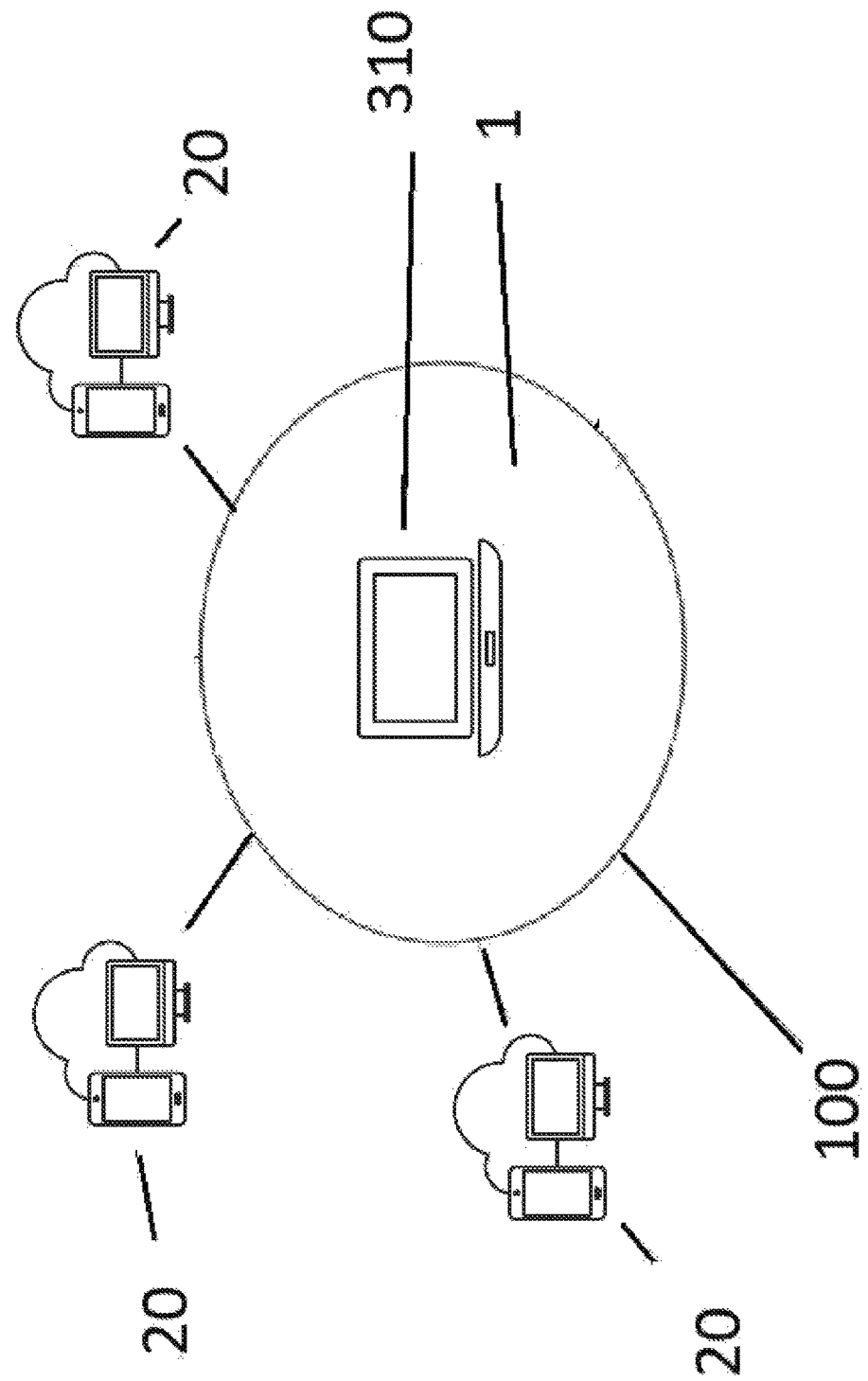
FIG. 1 shows an overview of how Users access the system.

FIG. 1 displays the preferred embodiment of the system architecture 1 accessed through an Internet, Intranet and/or Wireless network 500. However, the system could be implemented on a device-to-device or client/server architecture as well.

In FIG. 1, the system 1 is accessed from a user's computing device 20 through a web browser over HTTP and/or HTTPS protocols 500 or wireless network or cell phone to cell phone connection. A computing device 20, such as a cell phone, that can access the system 1 must have some version of a CPU, CPU memory, local hard disk, keyboard/keypad/input and display unit. The computing device 20 can be any desktop, laptop, tablet, smart phone or general purpose computing device with an appropriate amount of memory suitable for this purpose and an active connection to the Internet 500. Computing devices like this are well known in the art and are not pertinent to the invention.

The system 1, data and processing code can reside in the non-transitory memory 310 of the one or more computing devices. The system 1 in the preferred embodiment would be written to act like a smart phone application (app) where the different apps can communicate with each. The system 1 may work with a central server as shown in FIG. 1 or in parallel which each computing device 20 or smartphone communicating with others within the system 1.

The system 1, data and processing code can reside in the non-transitory memory 310 of the one or more computing devices. The system 1 in the preferred embodiment would be written to act like a smart phone application (app).

Figure 2:
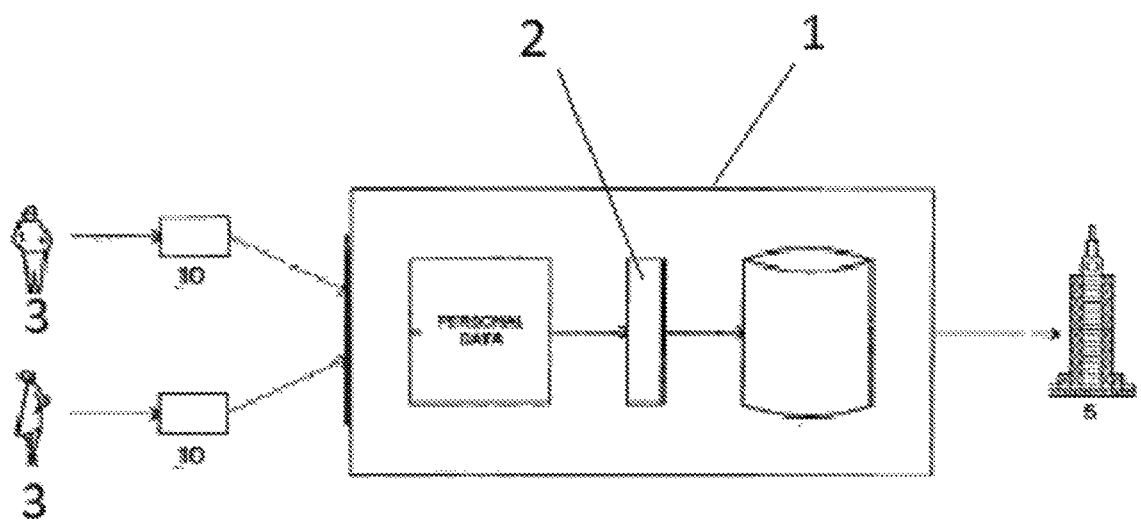
FIG. 2 shows the communication from the individual to the service provider.
Figure 3:
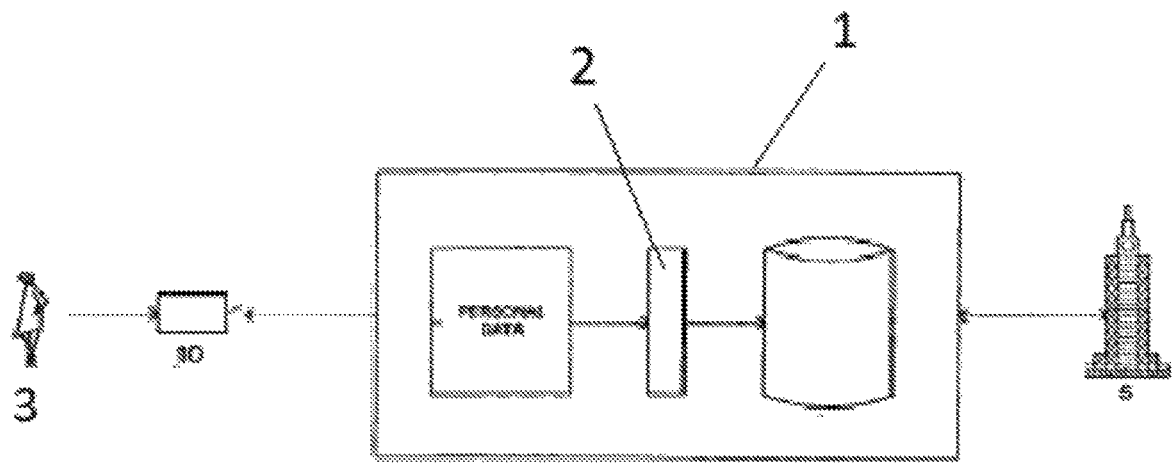
FIG. 3 shows the communication from the service provider to the individual.

The system's communication is between a user 1 and a service provide 5 as shown I FIGS. 2 and 3. FIG. 2 shows the data flowing electronically from the individual 3 to the service provider 5 while FIG. 3 shows the data flowing from the service provider 5 to the individual 3.

The system 1 normalizes data from each service provider 5 and individual 3 and writes it using a private BlockChain 2, as shown in FIGS. 2 and 3, that is secure, cryptographic and permission based while still being decentralized. A blockchain 2 is a decentralized, distributed and public digital ledger that is used to record transactions across many computers so that any involved record cannot be altered retroactively, without the alteration of all subsequent blocks. This is a unique feature that is designed to protect the data between the parties as its allows the individuals 3 to verify and audit transactions independently and relatively inexpensively. A blockchain 2 database is managed autonomously using a peer-to-peer network and a distributed timestamping server.

A blockchain 2 has been described as a value-exchange protocol. A blockchain 2 can maintain title rights because, when properly set up to detail the exchange agreement, it provides a record that compels offer and acceptance.

The individuals 2 will have accounts that has all the communication recorded. The individuals 2 will own all of their own data. The individuals 3 can deliver their data electronically to the service providers which allows for better individualized service.

The system 1 will use artificial intelligence ("AI") 400 within the system 1, as shown in FIG. 4, to analyze and prepare the data for proper communication. The AI 400 translates communication in a way that each party needs to see it. This includes translating it into different languages or even brail or sound if needed by the party. This communication can be across the internet and different destinations and/or websites.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A system comprising: being accessed by a computing device through a web browser, having a database in where the database is managed using a peer-to-peer network where the database uses a distributed timestamping server, having data and processing code reside in non-transitory memory where the data is owned by a sender; using blockchain to secure ongoing communication and conversation between an individual user and a service provider, providing a translation function where the communication is done electronically where the blockchain is a decentralized, distributed and public digital ledger where the blockchain is secure, cryptographic and permission based where the blockchain is used to record transactions across many computers so that any involved record cannot be altered retroactively without the alteration of all subsequent blocks; and having artificial intelligence to analyze and prepare the data for proper communication where the AI translates a communication if needed where the translation is one of the three of language, braille or sound.

2. The system according to claim 1 where the blockchain can record an offer and acceptance.

3. The system according to claim 1 where the blockchain is used to record transactions across many computers so that any involved record cannot be altered retroactively without the alteration of all subsequent blocks.

4. The system according to claim 1 where the database is managed using a peer-to-peer network.

* * * * *